United States Patent [19]
Barbour

[11] 3,797,917
[45] Mar. 19, 1974

[54] BOX AND VIEWER ASSEMBLY FOR SLIDES

[75] Inventor: Roberto Barbour, Roslyn Harbor, N.Y.

[73] Assignee: Cryton Optics, Inc., Roslyn, N.Y.

[22] Filed: Nov. 13, 1972

[21] Appl. No.: 306,034

[52] U.S. Cl................. 350/250, 40/63 A, 350/211, 350/245
[51] Int. Cl. ............................................. G02b 7/02
[58] Field of Search............ 350/211, 140, 235–257; 40/63 A

[56] References Cited
UNITED STATES PATENTS

| | | | |
|---|---|---|---|
| 2,794,367 | 6/1957 | Turner................................ | 40/63 A |
| 3,349,509 | 10/1967 | Balch................................. | 350/239 |
| 3,719,422 | 3/1973 | Land.................................. | 350/211 |
| 2,919,509 | 1/1960 | Strandberg......................... | 40/63 A |
| 1,989,454 | 1/1935 | Koster................................ | 350/239 |
| 3,566,523 | 3/1971 | Bower................................. | 40/63 A |

Primary Examiner—John K. Corbin
Assistant Examiner—Michael J. Tokar

[57] ABSTRACT

A box and lens assembly adapted to store photographic slides and being convertible into an optical viewer for inspecting the slides, each of which is constituted by a transparency mounted in a frame. The assembly comprises a rectangular container dimensioned to accommodate two stacks of slides in side-by-side relationship and a cover hinged thereto. The cover is provided with a peripheral flange having a side section and two end sections which, when the box is closed, lie against the corresponding walls of the container. The cover is fabricated of flexible material whereby the end sections of the flange may be pulled out slightly to define parallel sockets, one of which is usable to engage the lower margin of a slide to be viewed whereby the slide is held erect with its transparency exposed to ambient light. Receivable in the other socket is a Fresnel lens plate having the same dimensions as a slide, the optical characteristics of the plate being coordinated with the spacing between the parallel socket to afford an enlarged, well-focused image of the transparency.

2 Claims, 5 Drawing Figures

PATENTED MAR 19 1974 3,797,917
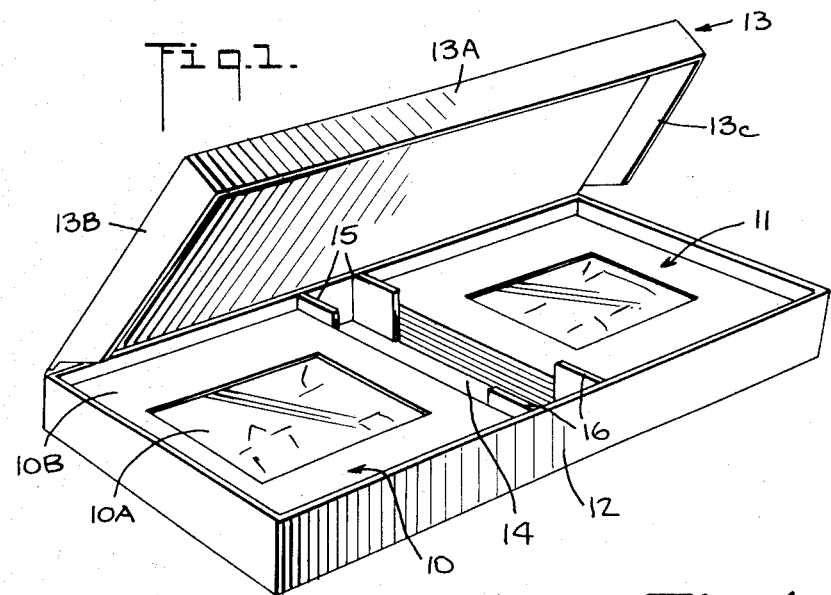
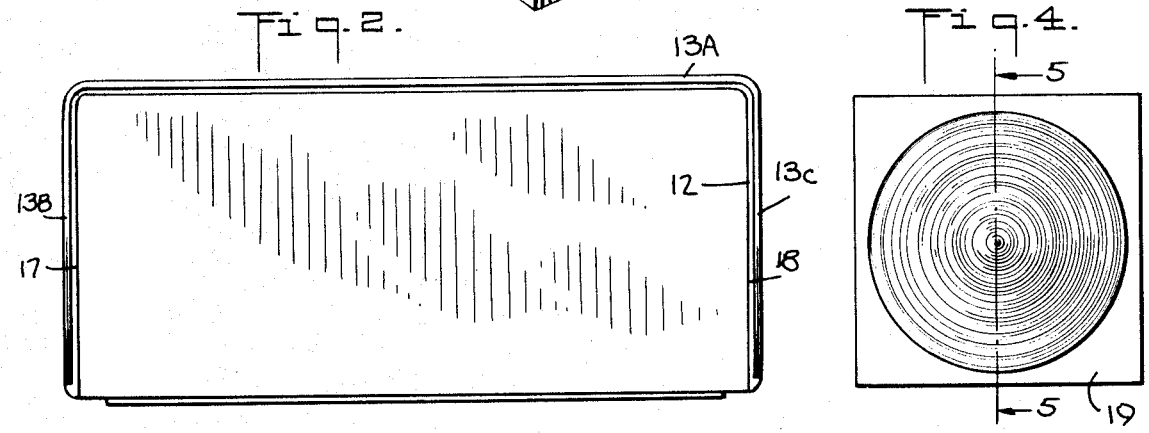
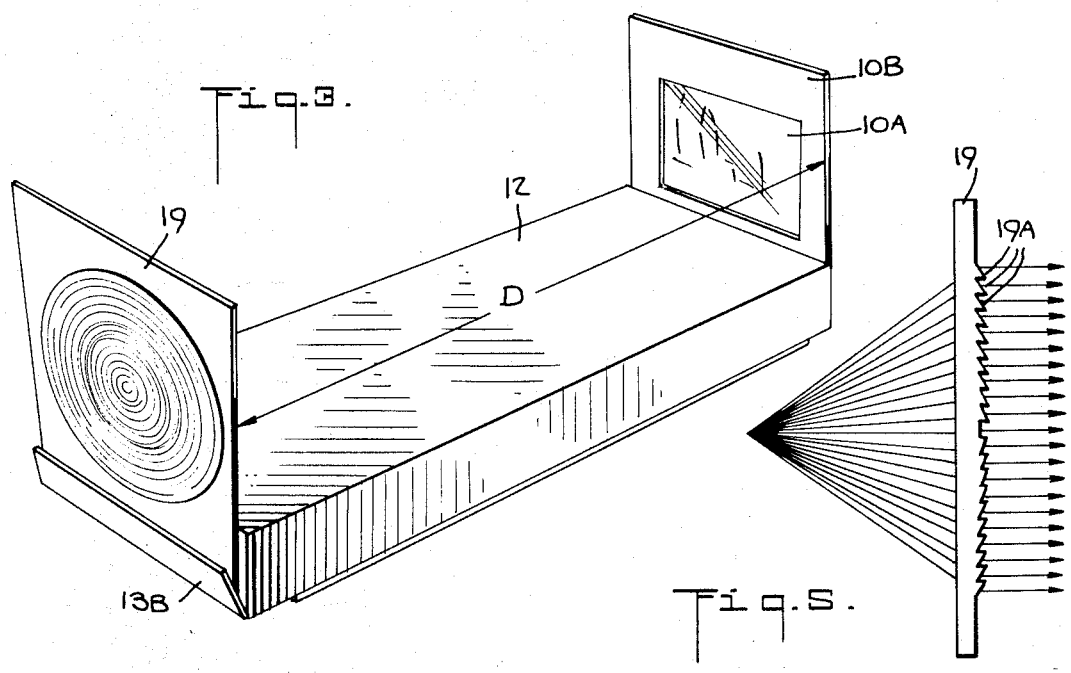

BOX AND VIEWER ASSEMBLY FOR SLIDES

BACKGROUND OF THE INVENTION

This invention relates generally to optical viewers for photographs, and more particularly to a viewer that also functions as a container for slides.

With most modern cameras, one has the option of having enlarged opaque prints made from the exposed film or of having small transparencies made therefrom. These transparencies are mounted in frames to provide slides for use in slide projectors which produce an enlarged image on a screen. In the case of slides, the usual commerical practice is to supply the customer with a shallow box adapted to accommodate two small stacks of slides, the stacks being spaced apart to facilitate removal.

With enlarged prints, one is easily able to directly view the picture, but with slides the scale of the picture is so small that even when the slide is held up to a bright light, the picture is difficult to see. When a projector or other form of optical viewer is available, then the slide may be readily inspected, but in some instances viewers are not available and yet there is a need to inspect the slides.

For example, film processors now have outlets in the form of small booths in railroad terminals, department stores and other locations. These booths serve as a station to receive film and to return prints and slides to customers, but they lack facilities for viewing slides. Hence when a customer receives a box of slides, his only means for checking to see whether the slides are acceptable is to hold them up to the light. This procedure is unsatisfactory, for the light is often poor and even if adequate, the small scale of the picture presents problems in viewing.

SUMMARY OF INVENTION

In view of the foregoing, it is the main object of the invention to provide a box and lens assembly adapted to store two stacks of slides and convertible into a miniature viewer wherein the box then functions as a holder both for a slide to be viewed and a lens plate serving to afford an enlarged, well-focused view of the slide.

More specifically, it is an object of the invention to provide an assembly of the above type which makes use of a low-cost Fresnel lens plate whose dimensions are the same as those of a slide assembly whereby the plate may be stored with the slides.

Thus the invention makes it possible for a customer to view his slides even when there is no access to a standard optical viewer or slide projector, for the slide box also functions as a viewer.

Briefly stated, these objects are attained in an assembly wherein the box is formed by a rectangular container dimensioned to accommodate two stacks of slides in side-by-side relation, and a cover hinged to one side of the container, the cover having a peripheral flange. The flange has a side section and two end sections which, when the box is closed, lie against the corresponding walls of the container. The cover is of flexible material whereby the end flanges may be pulled out slightly to define two parallel sockets, one of which is usable to clamp the lower margin of a slide to be viewed, thereby holding the slide erect and exposing the transparency therein to ambient light. Receivable in the other socket is a Fresnel lens plate whose dimensions are the same as a slide and whose optical characteristics are coordinated to the distance between sockets to afford an enlarged, well-focused view of the transparency.

OUTLINE OF DRAWINGS

For a better understanding of the invention as well as other objects and further features thereof, reference is made to the following detailed description to be read in conjunction with the accompanying drawings, wherein:

FIG. 1 is a perspective view of a box for containing slides;

FIG. 2 is a bottom plan view of the box;

FIG. 3 illustrates in perspective a box and lens assembly in accordance with the invention, serving as a slide viewer;

FIG. 4 is a front elevational view of the Fresnel lens plate, and

FIG. 5 is a section taken in the plane of line 5—5 in FIG. 4.

DESCRIPTION OF THE INVENTION

Referring now to the drawings and more particularly to FIG. 1, there is shown a box for housing two slide stacks 10 and 11. Each slide, as illustrated in stack 10, is constituted by a film transparency 10A mounted within a square frame 10B.

The box is composed of a rectangular container 12 having a cover 13 hingedly connected thereto along one side. In practice, the box is preferably molded or otherwise fabricated of a flexible plastic material. The dimensions of container 12 are such as to accommodate the two stacks of slides in side-by-side relation with a transverse channel 14 therebetween. Mounted at the ends of the channel are two pairs of upstanding tabs 15 and 16 which serve to maintain the separation between the two stacks of slides so that the slides may be readily removed by inserting a finger into the channel to engage the edges of the slides.

Cover 13 is provided with a peripheral flange having a side section 13A and two end sections 13B and 13C, the sections, when the box is closed, lying against the corresponding walls of the container 12, as shown in FIG. 2. Since the flange sections are composed of flexible material, the end sections 13A and 13C may be pulled slightly away from their corresponding container walls to define parallel sockets 17 and 18 whose length is equal to the end dimension of the box. This length substantially matches the edge dimension of the square slides contained in the box.

Thus, as shown in FIG. 3, it becomes possible to insert a slide in socket 18 at one end of the box. The lower edge of frame 10B of the slide is clamped between the flange section 13C and the corresponding end wall of the container to hold the slide erect and expose the transparency 10A to the light. Inserted in socket 17 is a Fresnel lens plate 19 whose dimensions are identical to that of the slide, the lower edge of the plate being clamped between flange section 13B and the corresponding end wall of the container to hold the plate erect. Thus the box serves as a holder to retain the slide and lens plate in parallel registration.

As is well known, a Fresnel lens is one that has a surface consisting of a concentric series of simple lens sections so that a thin lens with a short focal length and large diameter is possible. By means of a series of precisely spaced prismatic grooves 19A, as shown in FIG. 5, each at a different angle and a different depth, there is produced a flat surface lens with the optical characteristics of a curved lens surface.

By the use of clear durable plastic, such as polyethylene and by modern molding techniques, it becomes possible to produce a low-cost plastic Fresnel lens plate 19 whose optical characteristics are coordinated to the distance D between the lens plate 19 and the transparency 10A so as to provide a properly focused and enlarged image of the picture on the transparency when viewed through the lens. The distance D corresponds to the length of the box. In practice, the image on the transparency may be enlarged of 4 or greater.

Since the lens plate 9 is of exactly the same dimensions as a slide, it may be placed on top of one of the stacks 10 or 11 and supplied to a customer with the slides. The box not only serves as a container for the slides and lens plate, but is convertible into a simple and effective optical viewer, making it possible for the user to inspect his slides without the need for a separate optical viewer or slide projector.

While there has been shown and described a preferred embodiment of a box and viewer assembly for slides in accordance with the invention, it will be appreciated that many changes and modifications may be made therein wihtout, however, departing from the essential spirit thereof.

What I claim is:

1. A box and lens assembly adapted to store photographic slides of standard size, each having a transparency mounted in a frame and being convertible into an optical viewer for inspecting the slides, said assembly comprising:

A. a box having a rectangular container dimensioned to accommodate two stacks of slides in side-by-side relation and a cover hinged to one side of said container, said cover being provided with a peripheral flange having a side section and two end sections which, when the box is closed, lie against the corresponding walls of the container, said cover being fabricated of flexible material, whereby the end sections may be pulled out to define parallel sockets, one of which is usable to engage the lower margin of a slide to be viewed whereby the slide is held erect with its transparency exposed to ambient light; and B. a planar lens plate having the same dimensions as a slide, said plate being included in one of said stacks and being formed of transparent plastic material molded to define concentric prismatic rings constituting a Fresnel lens having optical characteristics coordinated with the spacing between said sockets to afford a well-focused image of the transparency being viewed, said plate being insertable into the other socket for viewing and enlarging the image on the transparency.

2. An assembly as set forth in claim 1, wherein said box is fabricated of flexible plastic material.

* * * * *